Aug. 2, 1938.  J. P. HANSEN  2,125,560
PHOTOGRAPHIC CAMERA FOR MULTIPHOTOGRAPHY
Filed Dec. 21, 1934
Fig. 1.
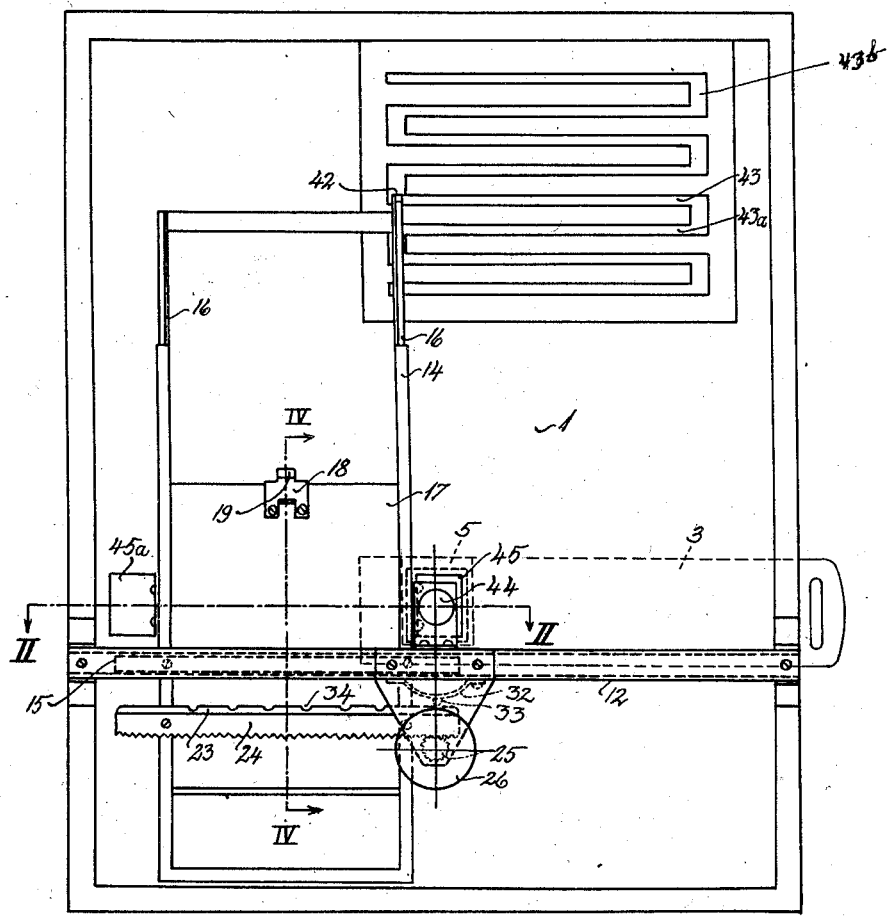
Fig. 2.
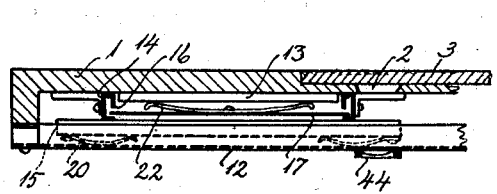
Fig. 3.  Fig. 4.
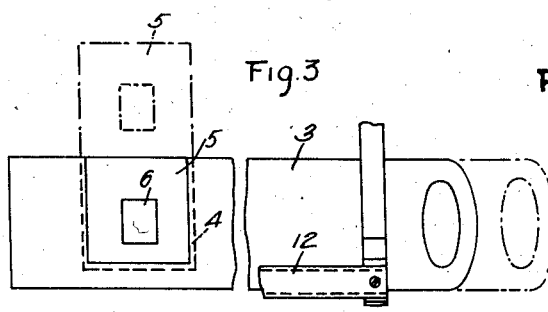
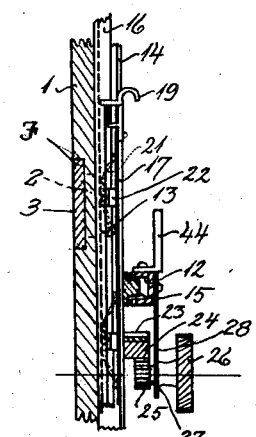
Inventor:
Jens Peter Hansen
By: Peter M. Boesen atty Patented Aug. 2, 1938

2,125,560

UNITED STATES PATENT OFFICE 2,125,560

PHOTOGRAPHIC CAMERA FOR MULTI-PHOTOGRAPHY

Jens Peter Hansen, Copenhagen, Denmark

Application December 21, 1934, Serial No. 758,674
In Denmark December 23, 1933

3 Claims. (Cl. 95—36)

Photographic cameras for multi-photography by means of which there are taken on a single, photographic plate several pictures the one after the other, as well alongside as underneath each other, are already known. In such apparatuses the photographic plate is moved jerk-wise past a picture field that is limited in correspondence with the desired picture size, while a Kino-shutter or similar shutter shuts off the light during the movement of the plate and exposes that part of the plate, which is in front of the picture field at the time, where the plate is stationary. When any known apparatus is to be focussed, a ground glass is inserted in place of the carrier for the sensitized material after this has been removed. The result is, that between the focussing and the exposing a rather long time elapses, and it is furthermore a very great inconvenience and causes waste of time that it is impossible to focus upon ground glass, unless the dark slide is previously removed, especially, as it is always necessary to insert a slide in the sensitized material carrier before removing it. In practice this means that focussing upon ground glass only can be made before the first taking and not during the subsequent takings, and the sharpness and the definition of the picture as well as the composition thereof is then impossible to control during the takings, so that the first made focussing cannot be altered. The consequence will be that the model can only make such slight movements, which do not call for changes of the focussing, and the aim, intended by multi-photography, which is to take as many pictures with as many different positions of the model as possible in the shortest available time, will then not be obtained. This drawback makes itself especially noted by moving objects, where quick exposures are necessary for the taking of natural pictures, for instance of children.

A further drawback of the known multi-photography apparatuses consists therein, that the step-wise movement of the plate is always constant and unchangeable, so that the numbers of pictures and thus the picture size cannot be varied, for which reason there is usually selected a large number of pictures, and accordingly the very small negatives cannot be retouched and are unsuitable for enlargment.

In the photographic camera according to the present invention these drawbacks are eliminated, as the camera is quick and simple in operation, because it is provided with ground glasses that are attached at each side of the sensitized material, so that the ground glasses alternately with the sensitized material can occupy the place in front of the picture field, in order that focussing may be carried out without removing the sensitized material carrier from the apparatus. In this way focussing on ground glass or controlling of the focussed picture with regard to sharpness and definition, composition, size of head, etc., can be carried out at least for each picture row, so that various positions and different head sizes of the same person can be produced on the sensitized material, or even pictures of different persons, or of the same person in different dresses and garments, as well as whole-figure pictures etc. Furthermore, the first picture in each row can be focussed until shortly before the moment of exposure, which is of greatest importance in portrait work, where it is desirable to catch the right facial expressions.

Another important feature of the camera according to the invention, is that it is possible to vary the number of pictures and the sizes of the pictures within the widest possible limits, and furthermore that on the same plate large and small pictures can be taken in any desired sequence, and finally, that all this can be done without removing the sensitized material carrier from the apparatus. Another advantage is that the masking arrangement for limiting the picture field to determine the size of the picture can be altered not alone without removing the sensitized material carrier from the camera, but also when the slide of the carrier is extracted and irrespectively of the position of the carrier in the apparatus. This special feature is essential in a camera, which has to combine the quickest possible manner of working with the ability to yield pictures of the highest artistic quality.

A camera according to the invention is shown in the accompanying drawing, where

Fig. 1 shows the camera seen from the rear,

Fig. 2 a section on line II—II in Fig. 1,

Fig. 3 the adjustable masking arrangement, and

Fig. 4 a section on line 4—4 in Fig. 1.

The lens, shutter and bellows of the apparatus may be of any suitable conventional construction.

To obtain variations in the size of the picture field and consequently of the pictures to be taken as well as regards their height and width as their number and the spacing between them, the different parts of the sensitized plate on which each picture is taken must be fixed in their proper position within the picture field by means of interchangable operating devices which according to the invention comprise a bar with depressions and attached to the movable parts of the mechanism, and coacting herewith projections on the rigid parts of the mechanism. One manner of construction of these parts is described in the following with reference to the drawing.

The camera has a work plate 1 provided with a lens aperture 2 over which there may be arranged different masks for altering the size of the picture. A suitable arrangement of this marking consists in the employment of a stiff bar 3, Fig. 3, provided with an aperture and around the sides and base of this aperture the bar has a pocket guide 4 into which a mask 5 with an aperture 6 may be inserted. The bar 3 is slidable in a recess F formed in the work plate 1.

The work plate 1 carries a guide bar 12, which in cross section is U-shaped. A holder 16, described below and carrying a sensitized material carrier 13 is inserted within a frame 14, which is open at the top end to allow the insertion of the holder 16, and on the rear side the frame 14 carries a bar 15 of T section that is slidable in the guide bar 12 in such a manner that the frame 14 with the sensitized material carrier holder 16 and the carrier 13 may be displaced horizontally.

In order to provide a light-tight fitting between the work plate 1 and the frame 14 there is arranged on both vertical sides of the frame 14 rails of L-section which are held yieldingly pressed against the work plate 1.

The sensitized material carrier holder 16 is formed as a frame to which a back plate 17 provided with a spring clasp 18, Fig. 1, is rigidly attached. The spring clasp 18 serves three purposes. By engaging the upper edge of the sensitized material carrier 13 inserted within the holder 16, the carrier is held against extraction in the holder. By engaging a cross rod 19 on the rear side of the sensitized material carrier holder 16 the spring clasp holds the back plate 17 in its proper position in relation to the carrier and holder, and finally by means of a catch 19 on the clasp the holder 16, the carrier 13, and the back plate 17 may be raised as a unit.

Between the T-shaped bar 15 and the guide bar 12 there are arranged leaf springs 20, Fig. 2, that press the frame 14 light-tight against the work plate 1, and between the holder 16 and the edges of the back plate 17, Fig. 4, other leaf springs 21 are interposed serving partly to press the back plate 17 against the frame 14, and partly to press the holder 16 light-tight against the work plate 1. On the front side of the back plate 17 there are arranged other leaf springs 22, Fig. 2, that press the sensitized material carrier 13 firmly against the work plate 1. These springs thus effectuate partly a light-tight pressure of the carrier and partly allow a smooth and yielding sliding operation of the slidable members.

The horizontal sliding movement of the frame 14 is brought about by means of a rack 24 that is attached across the frame 14 and moves together with it, and a toothed wheel 25 that is rigidly attached to a shaft 27 journalled in a plate 28 screwed to the cross bar 12 and depending outside the rack 24. The toothed wheel 25 is so disposed in relation to the rack 24 that the teeth of both members mesh, and by means of a hand wheel 26 fixed to the end of the shaft 27 projecting outside the plate 28, the toothed wheel 25 may be rotated for the lateral displacement of the frame 14.

To ensure the proper position of the separate pictures on the plate the guide bar 12 is provided with a spring member 32, Fig. 1, that has a projection 33 which, when the frame 14 with the sensitized plate is in position, enters notches 34 in a bar 23 attached interchangeably to the upper edge of the rack 24. The number of notches 34 in the bar 23 determines the number of pictures in a horizontal row, and by exchanging the bar with another having a different number of notches, it is possible to alter the number of pictures in a horizontal row. The number and the width of the pictures produced in a horizontal row is determined practically by the width of the plate itself and the number and relative position of the notches 34, and there is accordingly nothing to prevent taking pictures of different widths in the same row, if only the picture field determined by the lens is sufficiently large to cover the greatest width. The mask over the lens aperture 2 must be changed in accordance with the desired width of the picture.

The construction of the means for automatically displacing the plate in vertical direction are shown in Fig. 1. Here the one frame side of the sensitized material carrier holder 16 is extended upwards and on its upper end provided with a guide roll pin 42 engaging depressions in a guide plate 43 attached to the rear side of the work plate 1. The depressions 43 are formed as a number of relatively parallel horizontal paths 43a, each of which is connected by means of a vertical path 43b. The paths 43a and 43b thus guide both the horizontal movement and determines the vertical movement of the frame 14 and holder 16.

When the pin 42 is moved from the left to the right along one of the horizontal paths 43a, for instance that shown in Fig. 1, the weight of the frame 14 and the sensitized material carrier holder 16 will carry it down the vertical path 43b at the extreme right end of the horizontal path 43a, and the lateral movement may then continue along the next horizontal path 43a from the right to the left and so forth. The guide plate 43 is interchangeable in the work plate 1, so that the number of rows of pictures, the number of pictures in each row, the space between each row and the space between each picture in a row may be easily and quickly altered by extensively varying the number and arrangement of the horizontal and vertical paths.

Opposite the lens aperture 2 in the work plate 1 there is arranged a lens 44 on the upper side of the guide bar 12, through which lens it is possible to observe a ground glass plate 45 or 45a arranged one on each side of the frame 14 in alignment with the lens aperture 2 and in the plane of the sensitized material. The horizontal movement of the frame 14 is so that when one of the ground glass plates has reached the one end of its horizontal travel, it is disposed opposite the lens aperture 2. In this manner adjustments on the ground glass plate may be made every time the sensitized material has reached one of its extreme horizontal positions. This is not only of great importance for the control of the reception of so great a number of pictures as discussed here, but it is an absolute necessity when the sizes of the pictures are to be varied by altering the vertical or horizontal limiting devices and masks.

I claim:

1. The combination in a camera for multiple photography, of a work plate, a lens disposed within the camera in alignment with an aperture formed in the work plate, a guide device traversing the work plate and attached by its ends thereto, a frame disposed to move horizontally between the work plate and the guide device and guided by the latter, rotatable means journaled in a fixture attached to the guide device to cooperate with rigid means traversing the frame for displacing the latter laterally in relation to the lens aperture in the work plate, a sensitized material carrier, a holder for the said carrier disposed for vertical displacement within the frame, recessed guiding means arranged on the rear side of the work plate to cooperate with a guide member attached to an extension on the holder for displacing the latter during its downward passage in relation to the lens aperture in the work plate when the frame is in one of its extreme lateral positions, a ground glass plate attached to the side of the frame and so disposed as to be carried into alignment with the lens aperture in the work plate when the frame reaches one of its extreme lateral positions, a longitudinal recess in the work plate traversing the lens aperture in the work plate, and a mask slide disposed within the recess for displacement longitudinally therein.

2. In a camera for multiple photography as claimed in claim 1, the arrangement in the mask slide of an aperture, vertically disposed guides attached to the slide on either side of the aperture, and an interchangeable mask for insertion by hand between the guides.

3. The combination in a camera for multiple photography, of a work plate, a lens disposed within the camera in alignment with an aperture in the work plate, a cross bar of U-formed section traversing the work plate and attached by its ends thereto, a guide bar slidable longitudinally within the U-formed cavity of the cross bar, a frame attached to the guide bar and disposed for horizontal movement between the work plate and the cross bar, a ratchet attached to and traversing the frame below the cross bar, a notched bar attached to the upper edge of the ratchet, a lug attached yieldingly to the lower edge of the cross bar and engaging one of the notches in the notched bar, a downwardly extending plate attached to the cross bar, a shaft journalled in the lower end of the plate, a toothed wheel journalled on the said shaft and meshing with the ratchet, a hand wheel for rotating the toothed wheel for the lateral displacement of the frame, a sensitized material carrier, a holder for the said carrier disposed for vertical displacement within the frame, horizontal paths formed alongside each other in the upper portion of the work plate, vertical paths connecting alternately the ends of every two paths to form a total zig-zag path, a pin projecting from the upper end of the holder and engaging the said paths, a ground glass plate attached to the side of the frame and so disposed as to be carried into alignment with the aperture in the work plate when the frame reaches one of its extreme lateral positions, a longitudinal recess in the work plate traversing the aperture therein, and a mask slide disposed within the recess for displacement longitudinally therein.

JENS PETER HANSEN.